United States Patent
Bearden et al.

(10) Patent No.: US 6,732,168 B1
(45) Date of Patent: May 4, 2004

(54) METHOD AND APPARATUS FOR USE IN SPECIFYING AND INSURING POLICIES FOR MANAGEMENT OF COMPUTER NETWORKS

(75) Inventors: Mark Joseph Bearden, North Plainfield, NJ (US); Sachin Garg, Bridgewater, NJ (US); Woei-Jyh Lee, Silver Spring, MD (US); Aad Petrus Antonius van Moorsel, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 526 days.

(21) Appl. No.: 09/610,631

(22) Filed: Jul. 5, 2000

(51) Int. Cl.[7] .............................................. G06F 13/00
(52) U.S. Cl. ..................................................... 709/223
(58) Field of Search ................................. 709/200, 201, 709/203, 217, 218, 219, 220, 221, 222, 223, 224

(56) References Cited

U.S. PATENT DOCUMENTS

| | | | |
|---|---|---|---|
| 5,475,838 A | 12/1995 | Fehskens et al. .............. 714/57 |
| 5,717,747 A | 2/1998 | Boyle, III et al. ........... 379/242 |
| 5,872,928 A | 2/1999 | Lewis et al. ................. 709/222 |
| 5,909,550 A | 6/1999 | Shankar et al. .............. 709/227 |
| 6,449,650 B1 * | 9/2002 | Westfall et al. .............. 709/228 |
| 6,463,470 B1 * | 10/2002 | Mohaban et al. ............ 709/223 |
| 6,466,984 B1 * | 10/2002 | Naveh et al. ................ 709/228 |
| 6,487,594 B1 * | 11/2002 | Bahlmann .................... 709/225 |
| 6,539,483 B1 * | 3/2003 | Harrison et al. ............. 713/201 |
| 6,587,876 B1 * | 7/2003 | Mahon et al. ............... 709/223 |

OTHER PUBLICATIONS

"Enterprise network vendors have a slew of products meant to convince net managers they can benefit from policy networks", Network World, Sep. 27, 1999.*

M. Casassa Mont et al., "Power Phototype: Towards Integrated Policy–Based Management", http://www.hpl.hp.com/techreports/1999/HPL–1999–126.html, Oct. 18, 1999, pp. (a) & 1–14.

(List continued on next page.)

Primary Examiner—Moustafa M. Meky

(57) ABSTRACT

A policy-based network management system is realized by enabling policy-based management programs to be defined via run-time loading of "policy packages" that are collections of reusable "policy components". Such reusable policy components may be written by the vendor of the policy-based management system, or by system-administrators, who are the users of policy-based management systems or even by third-party people, who may be experts in the management of specific application domains such as vendors of network devices. In the latter case, these policy components can be assembled into a functionally complete policy package by system administrators. Alternatively, the system administrators can also load a pre-assembled policy package into a management server and only have to specify the desired service level goals.

32 Claims, 4 Drawing Sheets

OTHER PUBLICATIONS

Joel Conover, "Policy–Based Network Management" http://www.networkcomputing.com/shared/printArticle?article=nc/1024/1024fl.html&pub=nwc, Nov. 1999.

R. Bhatia, et al., "A Policy–based Network Management System", *Proceedins International Conference on Parallel and Distributed Techniques and Applications*, Las Vegas, Nevada, Jun. 1999,7 pages.

Mark A. Carlson, Create automated and distributed management applications with Jiro technology, Part 1, http://www.-avaworld.com/javaworld/jw–02–2000/jw–02–jiro p.html, Feb. 2000, 8 pages.

L. Lewis, "On the Integration of Service Level Management and Policy–Based Control", *In Proceedings, Policy Workshop 1999*, HP–Laboratories, Bristol, U.K. Nov. 1999, 3 pages http://www–dse.doc.ic.ac.uk/events/policy–99/pdf/14b–Lewis.pdf.

D. Verma et al., "Service Level Agreements and Policies", *In Proceedings, Policy Workshop 1999*, HP–Laboratories, Bristol, U.K., Nov. 1999, 7 pages. http://www–dse.doc.ic.ac.uk/events/policy–99/pdf/12–wijnen.pdf.

* cited by examiner

FIG. 1
TABLE 1

| GOAL | GOAL PARAMETERS |
|---|---|
| DURING "T", SATISFY "Q" FOR CLIENT "C" USING SERVICE "S" | C: Client ε {client1, client2, ...}<br>S: Service ε {Web, DNS, Fileserver, ERP, ...}<br>Q: QoS Expression<br>  Q.metric: QoS Metric ? {TransactionResponseTime, TransactionFailRate, ...}<br>  Q.op: Operator ε {=, ≤, ≥, ...}<br>  Q.value: Desired QoS Value ε {Float, Integer, Enumeration, ...}<br>T: TimeRange |

FIG. 2
TABLE 2

PROCEDURAL POLICY LOGIC

```
1.  if (¬satisfied ( getClientQoS( C, Q.metric), Q.op, Q.value ) )
2.  then
3.     set priority[C][S] = priority[C][S]++    // Make appropriate priorty adjustment, i.e. increase.
4.     enforce the following "if condition then action" rule at each network element E that switches packets sent to/from C:
5.        if (packet Z has arrived at E) && (timeOfDay is in T) &&
6.           ( ( { { Z.destIPport == S.serviceIPport ) && ( Z.srcIPsubnet == C.subnetMask } } } ||
7.             { { { Z.srcIPport == S.serviceIPport ) && ( Z.destIPsubnet == C.subnetMask } } } )
8.        then
9.           set Z.priority = priority[C][S]
10.       endif
11. endif
```

FIG. 3

TABLE 3

| COMPONENT IDENTIFIER | EXAMPLE POLICY COMPONENT DEFINITIONS |
|---|---|
| | GOAL PARAMETERS |
| MONITOR( G, D ) | For each (C, S, Q) such that C, S, and Q are parameters for goal G:<br><br>set satisfied[C][S][Q] =<br>    satisfied ( getClientQoS( C, Q.metric ), Q.op, Q.value ) ) |
| SETRULES( G, D ) | For each (E,C,S,T) such that E is a network element in domain D, and C,S and T are parameters for goal G:<br><br>if ( packet Z has arrived at E ) && ( timeOfDay is in T ) &&<br>  ( { { ( Z.destIPport == S.serviceIPport ) && ( Z.srcIPsubnet == C.subnetMask ) }<br>    { ( Z.srcIPport == S.serviceIPport ) && ( Z.destIPsubnet == C.subnetMask ) } }<br>then<br>    set Z.priority = priority[C][S]<br>endif |
| DECIDE_PRIORITY( G, D ) | For each (C, S, Q) such that C, S, and Q are parameters for goal G:<br><br>if ( satisfied[C][S][Q] == false )<br>then<br>    set priority[c][S] = priority[C][S]++  // Make appropriate priority adjustment. |

METHOD AND APPARATUS FOR USE IN SPECIFYING AND INSURING POLICIES FOR MANAGEMENT OF COMPUTER NETWORKS

U.S. patent application Ser. No. 09/610,630 was filed concurrently herewith, still pending.

TECHNICAL FIELD

This invention relates to computer networks and, more particularly, to management of resources and of Qualify of Service (QoS) in such computer networks.

BACKGROUND OF THE INVENTION

Policy-Based Management (PBM) systems are software applications that are used to manage computer networks. Such management systems allow the network administrator to specify declarative rules, collectively called "policies" or "policy rules" of the form "if event/condition then action" via a graphical or a textual interface. The PBM software translates these rules into low-level configuration commands, and sends them to the specified devices in the network. In other words, policy rules are used for remote, automatic configuration of network devices to drive the behavior of the network. The network performance, in turn, determines the quality of service (QoS) that a user observes. There are two key limitations of such prior policy-based management systems.

First, prior known policy-based management arrangements do not clearly distinguish the goal (i.e. the "What") of management from the policy (i.e. the "How") that achieves the goal. Indeed, from a system administrator's viewpoint, policy rules represent a specification of "what" needs to be achieved in terms of the network behavior. However, from the viewpoint of a client, i.e. the end user of a network service, such as Web or Domain Name Service (DNS), these rules do not represent his/her goals. The client is simply interested in realizing a certain level of service-level QoS. Indeed, the policy rules represent a "low-level" specification of "how" the client's QoS goals may be achieved, but not the goals themselves. In other words, there is no support in prior known policy-based management arrangements for specifying the client's service-level QoS goals along with the network management policy definition.

The second limitation of prior known policy-based management systems is that they are provided to the administrator as monolithic systems. That is, the functionality of known systems cannot easily be modified, or extended, by the administrator in an incremental manner. We illustrate this limitation with an example. As indicated above, the key task of policy-based management systems is to remotely send configuration commands to network devices. The particular protocol (SNMP, HTTP, LDAP, CLI over Telnet, or the like) used to send the commands depends on the network device, and as such, a policy-based management system supports a limited set of network devices and protocols. If a computer network deploys a currently unsupported device, then the lo system administrator must either live with the limitation, or wait for the vendor to supply an upgrade of the whole PBM software system, which supports this device. This second limitation is highlighted further by introduction of new protocols and new devices in the market. Moreover, even if a vendor continually upgrades the PBM software to support new protocols and devices, the system remains non-operational during the upgrade. In summary, no prior known policy-based management system allows for online modification of its "sub-systems", nor does it allow extensibility (in terms of device and protocol support) by a system administrator.

SUMMARY OF THE INVENTION

Problems and/or limitations of prior policy-based network management arrangements are addressed by employing a "policy component-based" system architecture instead of a monolithic one. This policy component-based architecture allows policies to be defined via run-time loading of "policy packages" that are collections of reusable "policy components". Such reusable policy components may be written by the vendor of the policy-based management system, or by system administrators, who are the users of policy-based management systems or even by third-party people, who may be experts in the management of specific application domains such as vendors of network devices. In the latter case, these policy components can be assembled into a functionally complete policy package by system administrators. Alternatively, the system administrators can also load a pre-assembled policy package into a management server and only have to specify the desired service level goals.

Specifically, one embodiment of the invention employs a management server including a graphical interface that allows a system administrator to load pre-assembled policy packages into the management server. Further, it allows the administrator to activate one or more policy packages, which requires supplying prescribed parameter values for a QoS goal and a policy enforcement "domain". A policy package includes all the logic needed to enforce a particular type of service-level QoS goal. Once activated, a policy package ensures that the specified QoS goal is delivered by monitoring and controlling network elements specified in the enforcement "domain". As indicated above, the logic in the policy components of a policy package represents the "how" of management, whereas the specified goal parameter represents the "what" of management. An advantage of this embodiment of the invention is that it encapsulates both the "What" and "How" of management in the same framework.

In another embodiment of the invention, service-level QoS goals are stored in a goal repository and continuously updated by adding, redefining, or removing service-level QoS goals as requested by an administrator.

In still another embodiment of the invention, policy packages are stored in a package repository where they are added, removed or updated by the system administrator.

BRIEF DESCRIPTION OF THE DRAWING

FIG. 1 is a table illustrating, in simplified and generalized form, example service-level QoS management goals;

FIG. 2 is a table illustrating, in simplified form, an example policy in the form of procedural logic;

FIG. 3 is a table illustrating, in simplified form, examples of policy component definitions;

DETAILED DESCRIPTION

Figure 4:
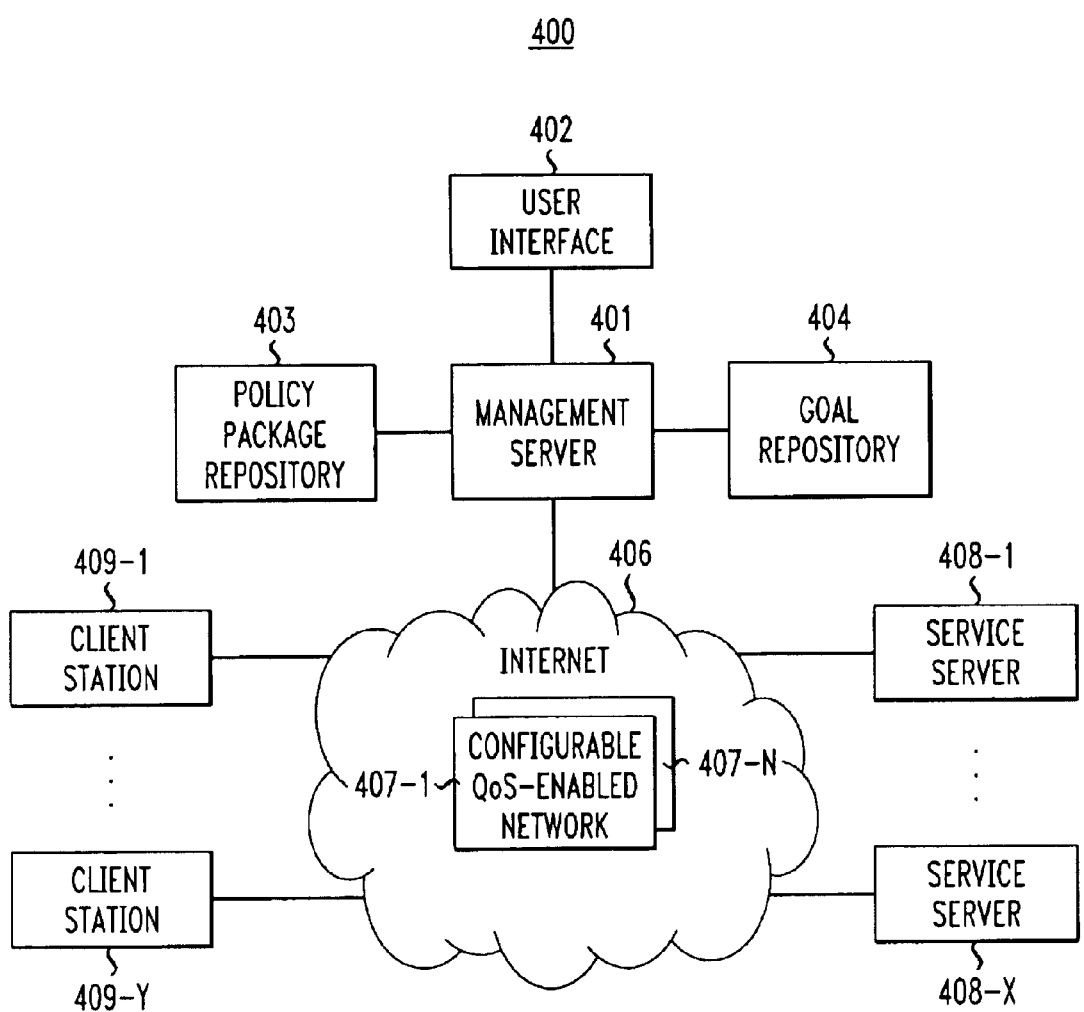
FIG. 4 shows, in simplified form, details of a network employing an embodiment of the invention.

FIG. 1 is a table illustrating, in simplified form, example service-level QoS goals. As shown, QoS goals are represented using the generalized goal template shown in TABLE 1, namely, "during T, satisfy Q for client C that uses service S". The goal parameters, in this example, are defined as follows. Parameters C and S identify respectively a client and some service accessed by the client, such as a Web or DNS server, a networked application server, or a file server. Parameter Q is a QoS expression with three parts, as follows. The first part is Q.metric that identifies a QoS metric such as end-to-end service delay, transaction failure rate, etc.; the second part is Q.op, an operator used to compute whether the client's delivered QoS value satisfies the desired QoS; the third part is Q.value, a value that represents the desired QoS for the given QoS metric. The QoS expression will evaluate to "true" or "false" at run time when the given operator Q.op is used to compare the delivered QoS for the given metric to the desired QoS, Q.value. Finally, parameter T identifies a time range when the given QoS goal is intended to have effect. By way of an example, consider an end-to-end QoS goal as follows: "Provide client Joe with average SAP transaction delay of at most 1 second," where SAP is an example networked service. This QoS goal is represented by setting the parameters of TABLE 1 as follows: C="Joe", S="SAP", Q.metric="AvgSAPTransactResponse", Q.op= "$\leq$", Q.value="1 second", and T="Always". The goal is satisfied when client Joe's average SAP transaction response time is determined, through observation and/or estimation, to be less than or equal to one second. The goal is not satisfied whenever Joe's SAP average transaction response time is determined to be greater than one second.

FIG. 2 is a table illustrating, in simplified form, an example policy expressed as a procedure for use in a policy package. Specifically, shown in TABLE 2 is pseudocode for one possible procedure for enforcing the above QoS goal in a networked system with priority-based packet switching and a function defined as getClientQoS( ) that measures or computes a client's transaction delay. The example pseudocode is explained as follows. The "if" condition in line 1 is satisfied when the delivered QoS for client C using service S does not satisfy the QoS expression of the goal specified for client C and service S. Line 3 specifies an example action that is expected to help the delivered QoS for client C to achieve the value specified in the goal. Specifically, in this example the priority for network traffic is increased, for traffic generated by client C accessing service S. Lines 5 through 10 specify a rule of the form "if condition then action" similar to those commonly supported by existing PBM arrangements and by existing QoS-enabled network devices. In lines 5 through 7, the condition part of the rule identifies that a given packet Z is part of client C's communication with service S. Line 9 contains the action part of the rule, which in the given example is setting the appropriate priority for switching and queuing the packet at network elements. Line 4 indicates that this policy rule should be enforced at each element in the network over which client C accesses service S.

It is noted that such a procedure can be specified by a management expert in advance and reused for a number of different goal parameters, i.e. for different clients, services, QoS metrics, etc. Indeed, the procedural policy specification is highly dependent on the types of parameters assigned to the QoS goal template, and on the types of resources in the networked system that can be controlled in order to enforce QoS.

It is felt best to consider some terminology. Thus, a "policy" is defined to be a process that implements a function with two parameters, namely, a "domain" and a "goal." A "domain" is a set of "targets". In turn, a "target" is any logical or physical element, i.e. network resource that is monitored or controlled to carry out network management. A "goal" is a proposition defined on (1) a "service", i.e. an application, (2) a "client" that accesses the service, (3) a "time range" for goal enforcement, and (4) a "QoS" "expression" specified using applicable metric identifiers, operators, and values. Again, an example goal proposition is as follows: Client=Joe, Service=SAP, Time=Always and TransactionDelay$\leq$1 ms.

A policy is said to be in an active, or enforced, state at certain points in time with respect to a particular domain and a goal. The transitions between active and non-active states, and non-active and active states, are called deactivation and activation, respectively. When a policy is activated, a domain and a goal must be specified.

A "policy instance" P(G,D) exists whenever goal G is enforced using policy P on domain D. The inputs to a policy instance are state updates of the client, service, and network elements that allow the client to access the service. The outputs are control signals sent directly or indirectly to network elements and resources to affect the client's QoS. Optionally, the outputs also include notifications sent to an administrative interface, including but not limited to service-level alarms and suggested manual network provisioning actions. A particular domain or goal can be associated with multiple simultaneously active policy instances. Note that a policy determines what monitoring and control actions should be taken on what subset of system resources in order to enforce the goal associated with the policy.

A "policy component" "PC" is a software object used as a building block to specify a policy. The basic idea is to separate the complete functionality of a policy into sub-parts that can be individually replaced or modified without replacing the rest of the policy. A typical policy includes functionality for monitoring network resources and delivered QoS. It also includes functionality for control of network devices, specifically, changing QoS parameters on a device such as DiffServ code point (DSCP) values. Further, a policy might optionally include functionality for filtering monitored data as well as optimization logic that determines when to trigger a particular action and with what parameters. A single policy component is typically designed to carry out a specialized task or computation, although it can contain all of the logic needed to implement the whole policy. If a policy is composed of such components, the following benefits may be derived. (1) A shared policy component interface allows different developers to independently develop portions of a policy. (2) Independently developed policy components may be composed to form a complete policy, which fosters software reuse. (3) Support for new network devices and protocols can be quickly incorporated by developing monitoring and control policy components for these devices and protocols. Moreover, these policy components can be incorporated into a policy without interrupting the operation of the management server.

FIG. 3 shows a table illustrating, in simplified form, examples of policy component definitions. TABLE 3 exemplifies the policy from TABLE 2 rewritten as a composition of three policy components (1) "MONITOR (G, D)", which is responsible for monitoring the actual delivered QoS to client C for service S via function "getClientQoS( )". (2) "SETRULES(G, D)", which is responsible for sending priority setting rules to a network device E in domain D. Setting the priority to a proper value will presumably enable the desired QoS goal to be delivered to client C of service S. In the logic thus far, the exact priority value has not been determined. That is the function of the third policy component, namely, (3) "DECIDE_PRIORITY (G, D)". Note that in the example, this policy component simply increments the priority value by one. However, more sophisticated logic for determining priority can be envisioned and implemented to replace the third policy component, even while the policy is activated. Note that each of the policy components is passed the values of the parameters G (goal) and D (Domain) at the time the policy is activated.

The basic policy component interface associates no specific management functionality with a policy component, defining instead just the interface that is common to all policy components. A fully defined policy component usually has additional interfaces that enable it to communicate with certain other policy components or managed system resources. The nature of these additional interfaces varies according to the specialized function of the policy component. Policy components can be executed after they are loaded at run-time by a container software object called a management server. The management server includes support for executing policy components. It also provides support for loading and initialization of policy components, intercomponent communication, and maintenance of shared policy component states.

A "policy package" "PP" is an object-oriented representation of a policy that specifies the type of goal and domain parameters required by the policy. A policy package includes, for example, (1) the definitions of one or more policy components, (2) a goal template and (3) a domain template. When the defined policy components are instantiated, they together form a policy instance. The parameters of the policy instance are a pair of domain and goal objects that are constructed using goal information provided by the system administrator at run-time. The goal and domain templates describe the type of information the system administrator must supply. A goal template defines the valid values that can be assigned to goal parameters for a goal of the form shown in TABLE 1 of FIG. 1. A domain template identifies what type of targets should be specified at run-time in order for the goal to be enforced.

Note that the creation of a policy instance corresponds to instantiation of the policy components in a policy package. At this time, the policy components in the package are instantiated and, in one example, are passed references to software objects that represent the appropriate domain and goal parameters for the policy instance.

An embodiment of the invention allows the user (system administrator) to specify a set of goals in a goal repository, thus describing the "what" of the service-level QoS management and also to load into the policy package repository the policy packages at run-time. For some goal G and domain D thus specified, a policy P is automatically selected, or is selected manually by the administrator, such that the effect of executing policy instance P(G,D) is to enforce goal G by monitoring and controlling elements in domain D. Thus, this embodiment of the invention accepts only a limited set of goals for which it contains the policy logic needed to enforce those goals and the policy package includes information that describes the possible goals for which the policy package can be used to enforce. The "how" of enforcing the goals is specified by the logic contained in policy components of the policy packages loaded in the invention's embodiment. As noted earlier, a simplified example of policy logic is given in TABLE 2 of FIG. 2.

FIG. 4 shows, in simplified form, details of network 400 employing an embodiment of the invention. Specifically, shown are management server 401 including an embodiment of the invention, an associated graphical user interface 402, policy package repository 403 and goal repository 404. Management server 401 is controllably connected to a data communication network 406, for example, the internet or World Wide Web (the Web), that includes a set of one or more configurable QoS-enabled network elements 407-1 through 407-N. A set of service servers 408-1 through 408-X is also controllably connected to data communications network 406. Finally, a set of client stations 409-1 through 409-Y is also controllably connected to data communications network 406. It is noted that client stations 409 may each be a personal computer, workstation or the like for accessing data communication network 406, i.e. the internet. In this example, configurable QoS-enabled network elements 407 may include network routers and switches, network traffic shapers, application-level traffic redirectors, application-level or network-level load balancers, or the like; the service servers 408 may include file servers (e.g. NFS), database servers (e.g. SQL), domain naming servers (e.g. DNS), network directories (e.g. LDAP), enterprise resource planning software (e.g. SAP or PeopleSoft), servers running any other networked application, or the like; and the client stations 409 may include thin client terminals, personal digital assistants, telephony devices, video devices, web browsers, applets, agents, client programs running on personal computers or workstations, or the like.

Management server 401 performs loading, reloading and unloading of policy packages; creation and destruction of policy instances; and enables policy component instances to send messages to other policy component instances. Once loaded, a policy package can be used to create a new policy instance by execution of the following steps:

Check to see if the indicated domain and goal match the types that are valid for the policy package as specified by the domain and goal templates in the policy package;

Check that there is not a policy instance already active for this (policy package, domain, goal) combination;

Create a new policy instance by instantiating each policy component contained in the policy package into the management server. In an example implementation, this instantiation is performed by loading Java policy component objects into the management server via a Java "virtual machine class loader";

Activate each policy component that is instantiated (loaded) in the previous step in the proper order. Activation starts the execution of each policy component.

Figure 5:
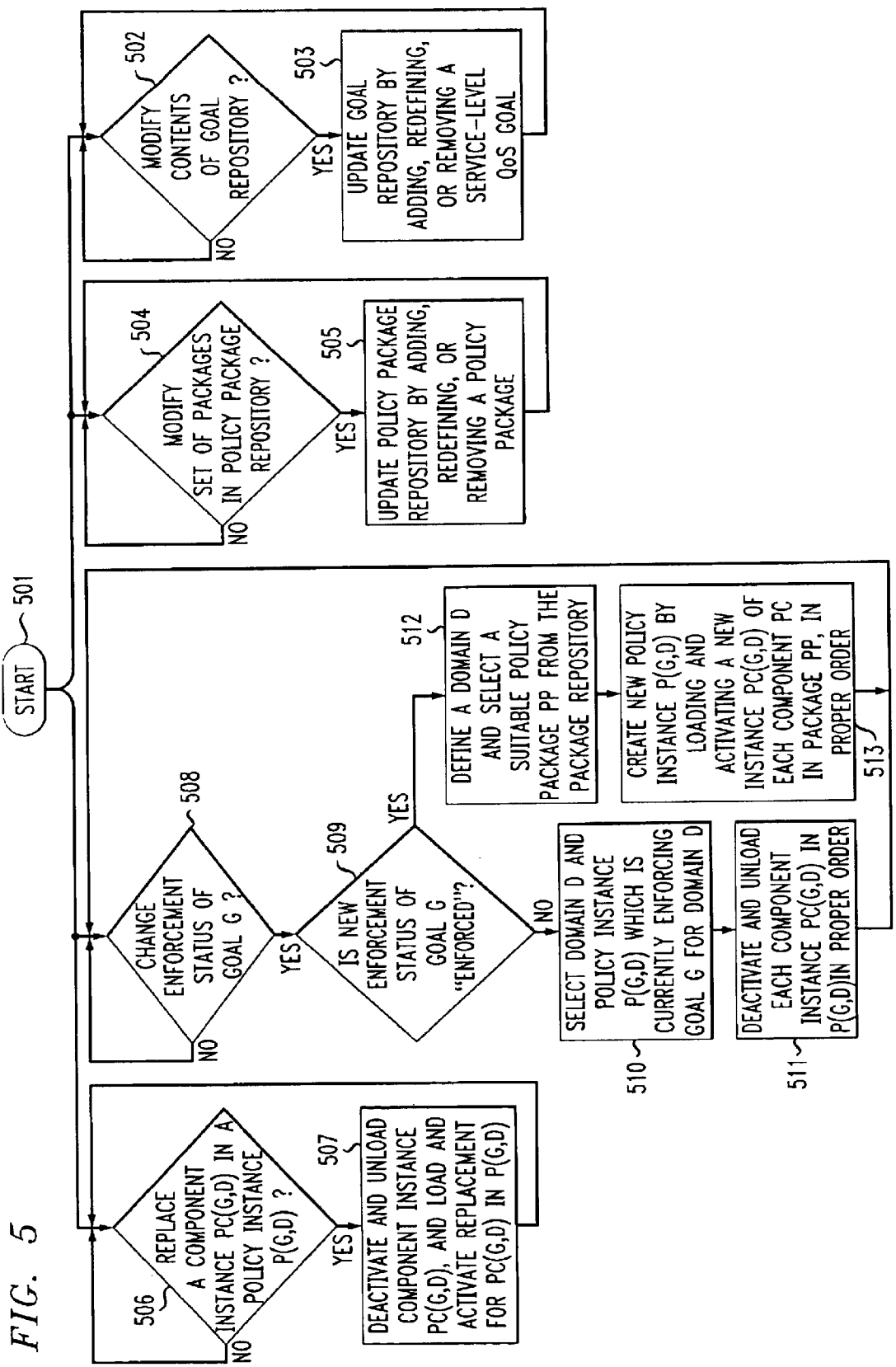
FIG. 5 is a flow chart illustrating steps in a process employed in an embodiment of the invention.

FIG. 5 is a flow chart illustrating steps in a process employed in an embodiment of the invention. The process is started in step 501. At run-time, a system administrator, or the like, employing user interface 402 loads a policy package from policy package repository 403, and defines a service level QoS goal by selecting a client from 409-1 through 409-Y, an application from service servers 408-1 through 408-X, and a QoS expression. Stated another way, user interface 402 allows the system administrator to specify goal parameters for a goal "G" and choose when attempted enforcement of "G" should begin. Additionally, the administrator defines a domain D or selects a predefined one by selecting a subset of network devices from the set of known network devices 407-1 through 407-N. At that time, management server 401 parameterizes and instantiates policy instance P(G,D) such that the policy logic of policy package PP is appropriate for enforcing goal G on domain D. For example, the policy logic described in simplified form in FIG. 2 could be selected to enforce a goal of the form given in FIG. 1. Thereafter, in this example, three sub-processes run concurrently in management server 401. An additional sub-process allows a policy component to be replaced in the loaded, i.e. activated policy package. Examples of policy components, in simplified form, are shown in FIG. 3. Specifically, a first sub-process includes maintaining the goal repository 404, a second sub-process maintains the policy package repository 403, a third sub-process determines if a policy component of an activated policy package shown be replaced and, if so, replaces it, and a fourth sub-process selects a policy package at run time from policy package repository 403 to be employed in effecting the QoS management of defined goals. Again, these four sub-processes, once started, run concurrently and continuously.

The first sub-process of maintaining the goal repository 404 includes step 502 that tests to determine whether the contents of goal repository 404 should be modified. If the test result in step 502 is YES, control is passed to step 503 that causes the updating of goal repository 404 by adding, redefining or removing a service level QoS goal. If the test result in step 502 is NO, the test is iterated until a YES result is obtained and control is again passed to step 503. Steps 502 and 503 are continuously iterated, as described above.

The second sub-process of maintaining policy package repository 403 includes step 504 that tests to determine whether the set of policy packages in policy package repository 403 should be modified. If the test result in step 504 is YES, control is passed to step 505 that causes updating of policy package repository 403 by adding, redefining, or removing a policy package. If a policy package is to be redefined and/or removed from the policy package repository, a check should be made to ensure that the intended package is not already active. In other words, if a policy instance P(G,D) exists for a certain policy package P the instance needs to be deactivated and unloaded from the management server before the corresponding package can be redefined or removed from the policy package repository. If the test result in step 504 is NO, the test is iterated until a YES result is obtained and control is again passed to step 505. Steps 504 and 505 are continuously iterated, as described above.

The third sub-process includes step 506 that tests to determine whether a particular policy component instance "PC(G,D)" in an activated policy instance "P(G,D)" should be replaced. If the test result in step 506 is YES, control is passed to step 507. Step 507 causes the deactivation and unloading of the particular policy component instance PC(G,D) from activated policy instance P(G,D), and the loading and activation of a replacement policy component instance for policy component instance PC(G,D) in activated policy instance P(G,D). If the test result in step 506 is NO, the test is iterated until a YES result is obtained and control is again passed to step 507. Steps 506 and 507 are continuously iterated, as described above.

The fourth sub-process of selecting a policy package at run time from policy package repository 403 to be employed in effecting the QoS management of defined goals includes step 508. Step 508 tests to determine whether or not there is a change in the enforcement status of defined goal "G". Among all the defined goals that exist at a certain time in the goal repository 404, the administrator will typically choose to enforce only a subset of these goals. In other words, a certain defined goal existing in the goal repository can be only in one of two states, "Enforced" or "Not Enforced". A change in the state of a goal is determined by the administrator. The test in step 508 indicates the administrator's preference in the enforcement status of a goal. If the test result in step 508 is NO, it is iterated until a YES test result is obtained, indicating that there is a new enforcement status for goal G, and control is then passed to step 509. Step 509 tests to determine whether the new enforcement status is enforced. If the test result in step 509 is NO, indicating that the new status is not enforced, control is passed to step 510. In step 510, a domain "D" is automatically selected, or the administrator is prompted to select domain "D". Also in step 510, a policy instance "P(G,D)" is identified in the management server such that "P(G,D)" is currently enforcing goal G for domain D. Then, step 511 causes the deactivation and unloading of each policy component instance PC(G,D) that is running as part of policy instance P(G,D). Note that since each policy component instance maintains an internal state and that the states of policy component instances are interdependent, it is necessary to deactivate and unload each of the policy component instances PC(G,D) in the proper order to ensure consistency of state. Upon completion of step 511 the state of goal G is "not enforced". Thereafter, control is returned to step 508 and appropriate steps 508 through 511 are iterated until the test result in step 509 is YES and control is passed to step 512. Step 512 causes two things. First, a domain "D" is selected, either automatically based on the value of goal G, or by prompting the administrator to select or define domain "D". Second, the selection of a suitable policy package is made, either manually by the administrator or automatically, from the available packages in the policy package repository 403. Automatic selection is made based on the goal and the domain template information contained in each policy package. Then, step 513 causes the creation of a new policy instance P(G,D) by loading and activating a new instance PC(G,D) of each policy component PC in the selected policy package, in proper order. Upon completion of step 513 the state of goal G is "enforced". It should be noted that a goal G is enforced for domain D if and only if there is a policy instance P(G,D). Thereafter, control is returned to step 508 and appropriate ones of steps 508 through 513 are iterated continuously as required.

The above-described embodiments are, of course, merely illustrative of the principles of the invention. Indeed, numerous other methods or apparatus may be devised by those skilled in the art without departing from the spirit and scope of the invention.

What is claimed is:

1. A method for use in a policy-based management system comprising the steps of:
   selecting a prescribed quality of service goal for a prescribed client and prescribed service and an enforcement domain for enforcing said selected goal, said selected goal representing the what of needs to be realized in terms of network/system behavior;
   automatically selecting in accordance with prescribed criteria a policy package, having goal and enforcement domain template information and having one or more policy components selected from a plurality of policy components, that is valid for enforcing said selected quality of service goal, wherein said prescribed criteria is based on said goal and enforcement domain template information contained in the policy package, said one or more policy components representing how desired network/system behavior is realized; and
   executing each of said one or more policy components in proper order in said selected policy package, wherein said selected quality of service goal is enforced in said enforcement domain.

2. The method as defined in claim 1 wherein said prescribed criteria includes selecting a policy package that is valid for enforcing said selected goal on said selected enforcement domain.

3. The method as defined in claim 1 further including steps of determining whether an enforcement status of said selected goal should be changed and, if so, determining whether a new enforcement status for said selected goal is enforced or not enforced.

4. The method as defined in claim 3 if said new enforcement status is enforced further including steps of defining an enforcement domain, selecting a suitable policy package based on said selected goal and said defined enforcement domain, wherein said policy package has one or more policy components, loading a new policy component instance for each of said one or more policy components in proper order, and activating each of said one or more loaded new policy component instances in proper order, whereby a new policy instance is created and said selected goal is in an enforced state.

5. The method as defined in claim 3 if said new enforcement status is not enforced further including steps of selecting an enforcement domain, selecting a policy instance for said selected goal and said selected enforcement domain which is currently enforcing said selected goal for said selected enforcement domain, wherein said policy instance includes one or more component instances, deactivating each of said one or more component instances in proper order, and unloading each of said one or more component instances in proper order, whereby said selected policy instance no longer exists and said selected goal is in a not enforced state.

6. The method as defined in claim 1 further including steps of storing said quality of service goals and determining whether said stored quality of service goals should be updated.

7. The method as defined in claim 6 further including a step of updating said stored quality of service goals.

8. The method as defined in claim 7 wherein each of said quality of service goals is a service level quality of service goal.

9. The method as defined in claim 8 wherein said step of updating includes steps of adding a service level quality of service goal to said stored quality of service goals, redefining a stored service level quality of service goal or removing a stored service level quality of service goal.

10. The method as defined in claim 1 further including a step of storing said policy packages.

11. The method as defined in claim 10 further including a step of determining whether said stored policy packages should be updated.

12. The method as defined in claim 11 further including a step of updating said stored policy packages.

13. The method as defined in clam 12 wherein said step of updating includes steps of adding a policy package to said stored policy packages, redefining a stored policy package or removing a policy package.

14. The method as defined in claim 10 wherein said policy package has been used to create one or more policy instances and each of said policy instances includes one or more policy component instances, and further including a step of determining whether a policy component instance of said one or more policy component instances in a policy instance of said one or more policy instances should be replaced.

15. The method as defined in claim 14 further including steps of deactivating said policy component instance to be replaced in said policy instance and unloading said policy component instance to be replaced in said policy instance.

16. The method as defined in claim 15 further including steps of loading a replacement policy component instance in said policy instance and activating said loaded policy component instance replacement in said policy instance.

17. Apparatus for use in a policy-based management system comprising:
   first means for selecting a prescribed quality of service goal for a prescribed client and prescribed service including means for selecting an enforcement domain for enforcing said selected goal, said selected goal representing the what of needs to be realized in terms of network/system behavior;
   second means for automatically selecting in accordance with prescribed criteria a policy package having goal and enforcement domain template information and having one or more policy components from a plurality of policy components, that is valid for enforcing said selected quality of service goal, wherein said prescribed criteria is based on said goal and enforcement domain template information contained in the policy package, said one or more policy components representing how desired network system behavior is realized; and
   means for executing each of said one or more policy components in proper order in said selected policy package, wherein said selected quality of service goal is enforced.

18. The apparatus as defined in claim 17 wherein said prescribed criteria includes selecting a policy package that is valid for said selected goal and said selected enforcement domain.

19. The apparatus as defined in claim 17 further including means for determining whether an enforcement status of said selected goal should be changed, and means for determining whether a new enforcement status for said selected goal is enforced or not enforced.

20. The apparatus as defined in claim 19 if said new enforcement status is enforced further including means for defining an enforcement domain, means for selecting a suitable policy package based on said selected goal and said defined enforcement domain, wherein said policy package has one or more policy components, means for loading a new policy component instance for each of said one or more policy components in proper order, and means for activating each of said one or more loaded new policy component instances in proper order, whereby a new policy instance is created and said selected goal is in an enforced state.

21. The apparatus as defined in claim 19 if said new enforcement status is not enforced further including means for selecting an enforcement domain, means for selecting a policy instance for said selected goal and said selected enforcement domain which is currently enforcing said selected goal for said selected enforcement domain, wherein said policy instance includes one or more component instances, means for deactivating each of said one or more component instances in proper order, and means for unloading each of said one or more component instances in proper order, whereby said selected policy instance no longer exists and said selected goal is in a not enforced state.

22. The apparatus as defined in claim 17 further including means for storing said selected quality of service goals and means for determining whether said stored quality of service goals should be updated.

23. The apparatus as defined in claim 22 further including means for updating said stored quality of service goals.

24. The apparatus as defined in claim 23 wherein each of said quality of service goals is a service level quality of service goal.

25. The apparatus as defined in claim 24 wherein said means for updating includes means for adding a service level quality of service goal to said stored quality of service goals, means for redefining a stored service level quality of service goal and means for removing a stored service level quality of service goal.

26. The apparatus as defined in claim 17 further including means for storing said policy packages.

27. The apparatus as defined in claim 26 further including means for determining whether said stored policy packages should be updated.

28. The apparatus as defined in claim 27 further including means for updating said stored policy packages.

29. The apparatus as defined in claim 28 wherein said means for updating includes means for adding a policy package to said stored policy packages, means for redefining a stored policy package and means for removing a policy package.

30. The apparatus as defined in claim 26 wherein said policy package has been used to create one or more policy instances and each of said policy instances includes one or more policy component instances, and further including means for determining whether a policy component instance of said one or more policy component instances in a policy instance of said one or more policy instances should be replaced.

31. The apparatus as defined in claim 30 further including means for deactivating said policy component instance to be replaced in said policy instance and means for unloading said policy component instance to be replaced in said policy instance.

32. The apparatus as defined in claim 31 further including means for loading a replacement policy component instance in said policy instance and means for activating said loaded policy component instance replacement in said policy instance.

* * * * *